(12) United States Patent
Baker

(10) Patent No.: US 6,661,811 B1
(45) Date of Patent: Dec. 9, 2003

(54) METHOD OF AND APPARATUS FOR COMMUNICATING ISOCHRONOUS DATA

(75) Inventor: Matthew P. J. Baker, Canterbury (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/488,031

(22) Filed: Jan. 20, 2000

(30) Foreign Application Priority Data

Feb. 12, 1999 (GB) .............................................. 9903144

(51) Int. Cl.[7] .................................................. H04J 3/06
(52) U.S. Cl. ........................................ 370/516; 375/371
(58) Field of Search ................................. 370/252, 253, 370/498, 503, 516–518, 395.1; 375/355, 362–366, 371, 372, 373

(56) References Cited

U.S. PATENT DOCUMENTS

| | | | |
|---|---|---|---|
| 5,486,864 A | 1/1996 | Zdepski | 348/423 |
| 5,517,505 A | 5/1996 | Buchholz et al. | 370/105.1 |
| 5,640,388 A | 6/1997 | Woodhead et al. | 370/468 |
| 5,790,543 A | 8/1998 | Cloutier | 370/395 |
| 6,259,677 B1 * | 7/2001 | Jain | 370/252 |
| 6,266,384 B1 * | 7/2001 | Acampora et al. | 375/363 |
| 6,278,710 B1 * | 8/2001 | Eidson | 375/371 |
| 6,327,274 B1 * | 12/2001 | Ravikanth | 370/516 |
| 6,449,291 B1 * | 9/2002 | Burns et al. | 375/371 |
| 6,452,950 B1 * | 9/2002 | Ohlsson et al. | 370/516 |

* cited by examiner

Primary Examiner—Ricky Ngo
Assistant Examiner—Christopher M Swickhamer

(57) ABSTRACT

In order to enable isochronous data to be transmitted over communications systems which may introduce timing jitter each packet of isochronous data is provided with a timestamp which indicates to a receiver the time at which a packet should be processed. The receiver notes the time the first packet of a data stream arrive and adds a given offset time which is greater than or equal to the maximum jitter to produce a time t1. Each succeeding packet is processed at a time $t = t1 + (Tn - T1)$, where T1 is the timestamp in the first data packet and Tn is the timestamp in the current packet. Thus the processing at the receiver is dependent on the relative times of arrival of the packets rather than the absolute times defined by the timestamps.

16 Claims, 5 Drawing Sheets

METHOD OF AND APPARATUS FOR COMMUNICATING ISOCHRONOUS DATA

FIELD OF TECHNOLOGY

The invention relates to a method of correcting timing errors when transmitting isochronous data through a packet based communication network in which at least some of the data packets contain timestamps which indicate to a receiver the time at which the data should be processed and to apparatus for carrying out such a method.

BACKGROUND AND SUMMARY

In digital communication systems, it is common for information, which is to be sent from a transmitting device to a receiving device to be divided into packets. Such packets may be delayed by a finite and varying length of time as they pass through the communication system.

The transmission of isochronous data through a communication system requires the maintenance of an accurate timing relationship between the transmitting device and the receiving device in order to preserve the quality of the services using the communication system. Such isochronous data may for example convey video or audio services. If the communication system fails to uphold the timing relationship between the transmitting device and the receiving device it may be unable to provide an acceptable quality of video and/or audio service at the receiving end of the transmission.

An example of such an application is the transmission of digital audio and/or video signals, which are encoded according to MPEG (Moving Picture Experts Group) standards. The bit clock of the MPEG decoder in the presentation device must run at the same rate as the bit clock in the device that originally encoded the data according to the MPEG standard. In order to achieve this the MPEG Standards require the encoding device to place a timestamp, known as a Program Clock Reference (PCR) or System Clock Reference (SCR), on some of the packets of MPEG data. The decoding device detects and reads the PCR or SCR values, and uses these to send signals to its internal clock in order to control the rate thereof.

Such a timing relationship may be maintained if the transmitting device transmits the packets of data at the same rate as said packets are required to be processed by the real-time application at the receiving end of the communication system, and the length of time by which each packet is delayed during transmission through the communication system is the same for every packet.

However, in practical digital communication systems, such as IEEE1394, Hiperlan (High Performance Radio Local Area Network), ATM (Asynchronous Transfer Mode), or UMTS (Universal Mobile Telecommunications System), the length of time for which each packet is delayed may vary from packet to packet. In the case of transmission of MPEG encoded data, such a variation in transmission delay results in erroneous correction signals being supplied to the internal clock of the decoder.

One method which has been proposed to overcome the effects of the transmission jitter is to use a buffer in the receiving device, into which buffer the received packets destined for the application are temporarily stored. The packets are then taken from the buffer to the application part of the receiving device, or to the next stage of a communication system, at a rate determined by an algorithm which has the amount of data contained in the buffer as one input. In the absence of additional features, this approach has drawbacks that may include the size and hence the cost of the required buffer and the level of accuracy of the rate of data output from the buffer.

Another proposed method, which claims to overcome the problem of transmission jitter, is disclosed in U.S. Pat. No. 5,790,543. This publication discloses the use of a further clock in the receiving device that is independent of the transmission clock, that is the receiver clock is not synchronised with the transmitter clock. The difference between the timestamps of successive packets, representing the difference in expected times of arrival of the successive packets, is subtracted from the difference between the values of the further independent clock at the instants at which the packets arrived. This latter difference is then referred to as the actual interarrival time of the packets. The result of this subtraction process is claimed to represent the jitter incurred by the data packets during transmission through the communication system. The present applicant, however, believes that this procedure will not result in accurate correction of any jitter in the transmitted data.

Another method of overcoming the transmission jitter when a separate clock is contained in each device in the communication system is to maintain these separate clocks in synchronism using packets transmitted via the communication system. To achieve this a further timestamp may be added by a transmitting device to some or all of the isochronous data packets that represents the future value of the separate clock in the transmitting device a predetermined interval after the time at which the data packet is ready for transmission. Such a timestamp may then be detected and read by the receiving device. The correct, jitter-free time at which the data packet should be delivered to the application is the time at which the value of the timestamp in the packet is equal to the value of the synchronised clock in the receiving device. The predetermined interval must be such that the timestamp corresponds to a time no earlier than the current time at the receiver. This method may be used, for example, when isochronous data is transmitted on an IEEE1394 bus using the Common Isochronous Packet (CIP) format defined in IEC61883 and illustrated in FIG. 1. Each device on the IEEE1394 bus contains a totally independent free running 24.576 MHz clock, for which one cycle lasts 40.69 ns. This period is known as one "tick". Each device which is capable of handling isochronous data on the IEEE1394 bus also contains a Cycle Time Register (CTR), whose format is shown in FIG. 2, which contains a 32-bit representation of current time. This register is updated every 40.69 ns by the 24.576 MHz clock. Furthermore, one of the devices on the IEEE1394 bus is specified as the "Cycle Master" by a mechanism defined in IEEE1394. To maintain synchronism between the CTRs of all the devices on the IEEE1394 bus a "Cycle Start" packet is transmitted by the Cycle Master after every 3072 ticks on average. The "Cycle Start" packet contains the current value of the CTR in the Cycle Master. Reception of a Cycle Start packet by a non-Cycle Master device, which contains a CTR, is interpreted as a command to write the value contained in the Cycle Start packet into the CTR of the receiving device. Isochronous data packets, which are transmitted from a transmitting device on the IEEE1394 bus in the CIP format, are labelled with a timestamp. This timestamp represents the sum of a fixed offset and the value of the CTR in the transmitting device at the time at which the packet is presented for transmission by the encoder or other source of isochronous data. When the receiving device receives such a packet, it holds the packet in a buffer until the value of the timestamp of the packet is equal to the value of the CTR in the receiving device. At that time, the packet may be processed by the application in the receiving device. It is evident that this approach depends on the absolute values of the CTRs being equal in all isochronous-capable devices on the IEEE1394 bus and also on the value of the fixed offset, which is added to the timestamps, being greater than the total transmission delay between the transmitting device and the receiving device. These dependencies become a serious drawback when different IEEE1394 buses are connected together by a communication bridge, for example according to the IEEEp1394.1 standard. In this latter example, although the CTRs in all the isochronous-capable devices on a particular IEEE1394 bus are synchronised both in frequency and in absolute value according to the CTR in the Cycle Master on that particular bus, the absolute values of the CTRs on different buses may nonetheless not be equal. Furthermore, an additional undefined delay may be introduced as the packets cross the bridge between the IEEE1394 buses. It therefore becomes necessary in the inter-bus bridge as defined in IEEEp1394.1 to detect the CIP timestamps in the isochronous data packets and modify them to reflect both the absolute difference between the CTR values on opposite sides of the bridge and the delay which the isochronous data packets encounter in being transmitted across the bridge, in order that when the isochronous data packets are received in the receiving device the timestamps may still represent a time in the future according to the CTR in the receiving device. Furthermore, the CIP format usually includes two separate timestamps, both of which need to be modified in a similar way. The drawbacks of this approach include the additional delay inherent in the process of modifying the timestamps in the bridges, the adverse effect on the complexity and hence the cost of such bridges, and the fact that it breaches the recognised OSI model (FIG. 3) for the good-practice operation of communication systems according to a protocol stack consisting of distinct layers.

It is an object of the invention to enable the provision of a method of correcting timing errors when transmitting isochronous data through a packet based communication network in which at least some of the data packets contain timestamps which indicate to a receiver the time at which the data should be processed in which at least some of the disadvantages of the prior art methods are mitigated. It is a further object of the invention to enable the provision of apparatus for carrying out such a method The invention provides method of correcting timing errors when transmitting isochronous data through a packet based communication network in which at least some of the data packets contain timestamps which indicate to a receiver the time at which the data should be processed, the method comprising the steps of;

a) inserting timestamps in isochronous data packets which relate to an absolute time as defined by a transmission clock and which are to be transmitted over a transmission network, b) receiving the data packets and detecting and recording the timestamps therein, c) providing a receiver clock which is synchronised in frequency but not necessarily in absolute time with the transmission clock, d) storing the absolute time of the receiver clock when the first packet containing a timestamp is received, e) adding a given time offset to the stored receiver clock time, the offset being greater than or equal to the maximum variation in time between successive received data packets, to define the output time of the first of the received data packets f) subtracting the value of the timestamp in the first received data packet from the timestamp in each subsequently received data packet, and g) adding the difference between the timestamp of the present data packet and the timestamp of the first data packet to the output time of the first data packet to define the output time of the present packet.

Thus, the method according to the invention does not depend on absolute values of timestamps but instead may start the processing of received packets a given time after the receipt of the first packet and the time of processing each succeeding packet is defined by the difference between the timestamp in the initial packet and the timestamp in the present packet. By ensuring that the clock frequency in the receiver is locked to that in the transmitter and that the given time is greater than or equal to the maximum variation in time between successive received packets it can be ensured that the times of processing the received packets are synchronised with the clock in the encoder.

To perform a method according to the invention a receiving device is connected by means of a communication system to a transmitting device. The receiving device, which is capable of receiving and processing isochronous data, contains a clock that is synchronised in frequency but not necessarily in absolute value to a similar clock in the transmitting device by means of a communication system.

The transmitting device adds timestamps to some or all of the data packets in an isochronous data stream for transmission by means of the communication system to the receiving device. The timestamps may represent either the value of the clock in the transmitting device or the sum of the value of the clock in the transmitting device and a fixed constant offset, which may be positive or negative. If such a fixed offset is used, the present invention does not require the value of the offset to be communicated to a receiving device.

The receiving device has means to detect the timestamps and to register the value thereof. When the first data packet of an isochronous stream is received from the communication system by the receiving device, the receiving device registers the time, $t_1$, of its internal synchronised clock, and also the value, $T_1$, of the timestamp in the data packet. This packet is then placed in a buffer for a time $\Delta$, where $\Delta$ is chosen to be greater than the maximum jitter that is likely to occur in such a communication system. After the time $\Delta$, the packet is fed from the buffer to the next stage of the receiving device or communication system.

When each subsequent packet of the data stream is received from the communication system by the receiving device, the receiving device detects and registers the value $T_n$ of the timestamp of the packet, before placing the packet in the buffer. The $n^{th}$ packet of the stream is output from the buffer at a time given by $t_1+\Delta+(T_n-T_1)$.

Consequently, any jitter which may have been introduced by the communication system is removed by means of relating each absolute timestamp to the internal clock of the receiving device, which is synchronised by means of the communication system to an internal clock in the transmitting device.

The method of the present invention is particularly advantageous in overcoming jitter in a communication system which uses timestamps which are related to the absolute value of a clock where the clock is synchronised in frequency but not necessarily in absolute value to a clock in a receiving device in the communication system using signals sent over the communication system. In particular the method of the present invention requires no knowledge of the maximum delay that may be experienced by data packets being transmitted through the communication system. It does, however, in common with all prior art mechanisms for jitter correction, require knowledge of the difference between the maximum and minimum delays experienced by data packets in a particular stream. Furthermore, the method according to the present invention does not require any modification to the timestamps during transmission of the data packets, nor on reception of the data packets in a receiving device. The method of the present invention has the advantage of simplicity in that it only requires one subtraction and one addition to be carried out per packet for all packets subsequent to the first packet of a stream in order to overcome any jitter and to output the packets with timing substantially corresponding to the original timing with which the packets were queued for transmission in the transmitting device. In addition by avoiding any requirement to modify timestamps during the transmission process, the present invention enables the layered OSI model for good-practice design of communication systems to be adhered to. The method has the advantage of reliably overcoming jitter by means of an already present clock that is synchronised in frequency by means of the communication system and, consequently, long-term drift may be avoided.

The invention further provides apparatus for correcting timing errors when transmitting isochronous data through a packet based communication network in which at least some of the data packets contain timestamps which indicate to a receiver the time at which the data should be processed, the apparatus comprising means for inserting transmission timestamps in isochronous data packets which relate to an absolute time as defined by a transmission clock and which are to be transmitted over a transmission network, means for receiving the data packets and detecting and temporally recording the transmission timestamps therein, a receiver clock which is synchronised in frequency but not necessarily in absolute time with the transmission clock, means for storing the absolute time of the receiver clock when the first packet containing a transmission timestamp is received, means for adding a given time offset to the stored receiver clock time, the offset being greater than or equal to the maximum variation in time between successive received data packets, to define the output time of the first of the received data packets, means for subtracting the value of the transmission timestamp in the first received data packet from the transmission timestamp in each subsequently received data packet, and means for adding the difference between the transmission timestamp of the present data packet and the transmission timestamp of the first data packet to the output time of the first data packet to define the output time of the present packet.

Such apparatus is constructed to perform a method according to the invention and enables the use of the method in transmitting data from a transmitting device to a receiving device in an isochronous manner without requiring the communication network to operate isochronously.

BRIEF DESCRIPTION OF THE DRAWING FIGURES

The above and other features and advantages of the invention will become apparent from the following description, by way of example, of an embodiment of the invention with reference to the accompanying drawings, in which.

Figure 7:
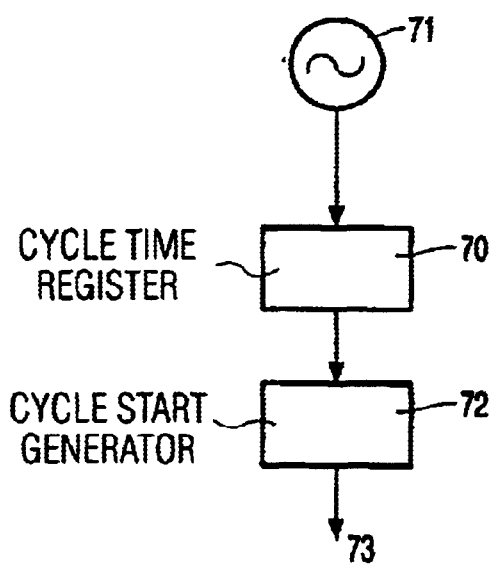
Figure 4:
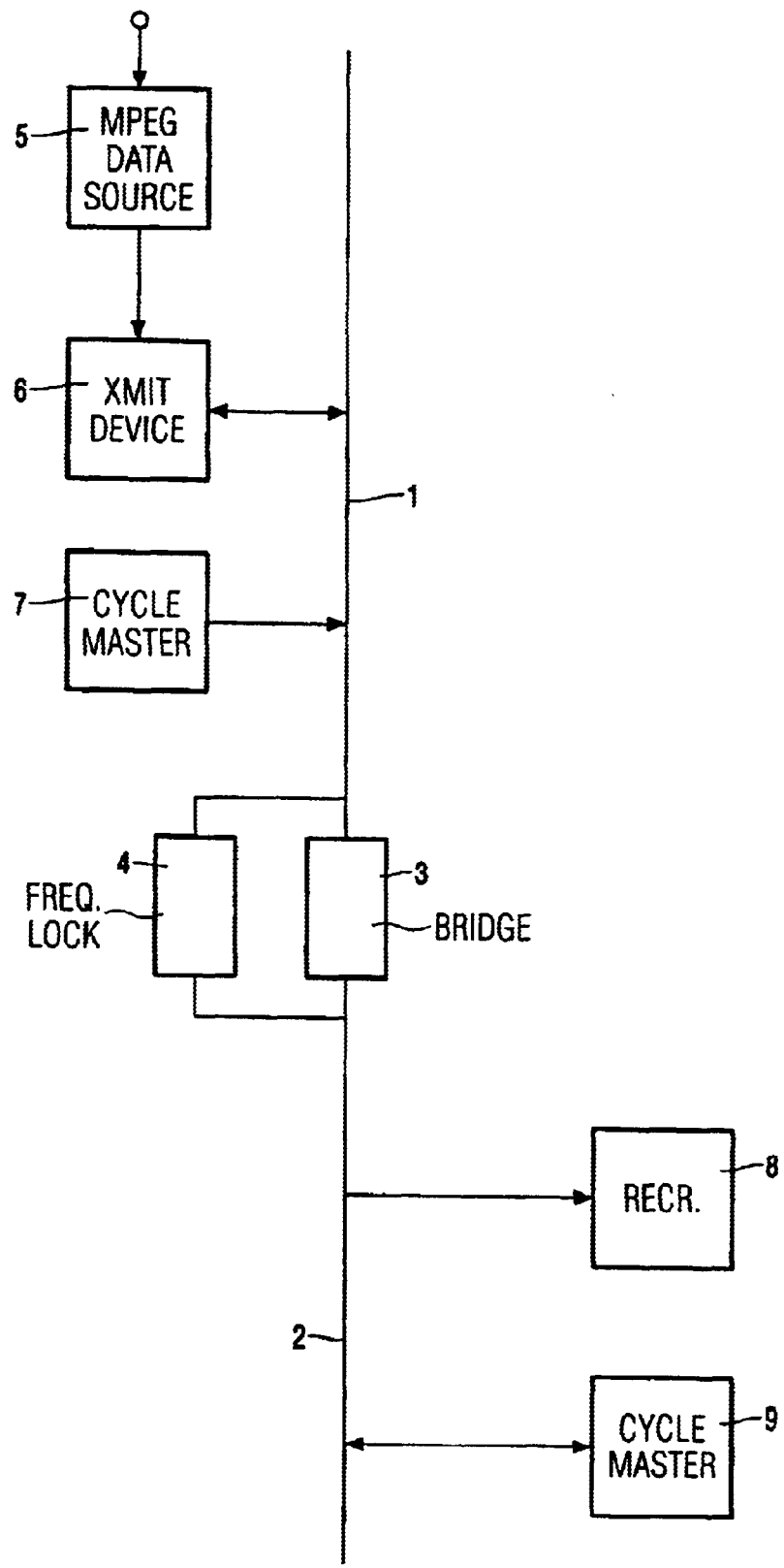
Figure 5:
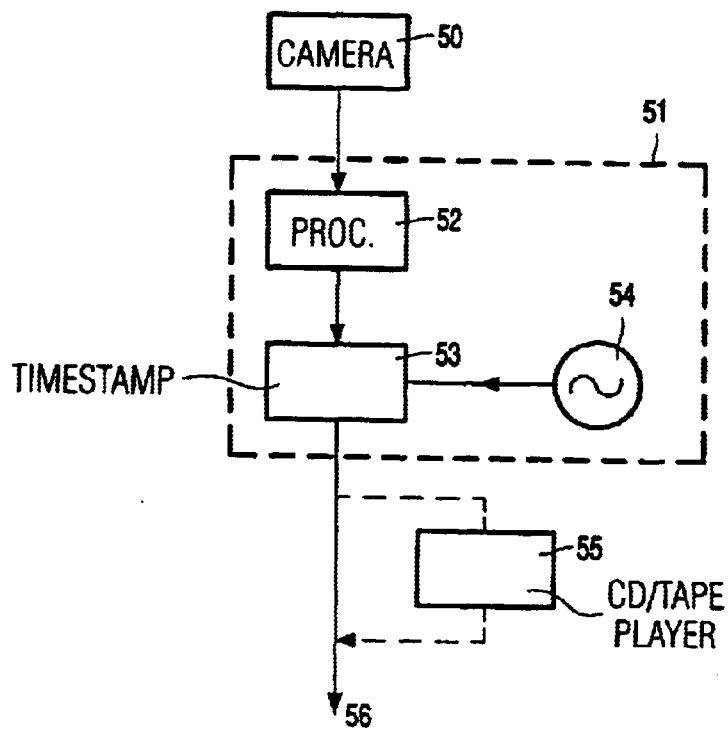
Figure 6:
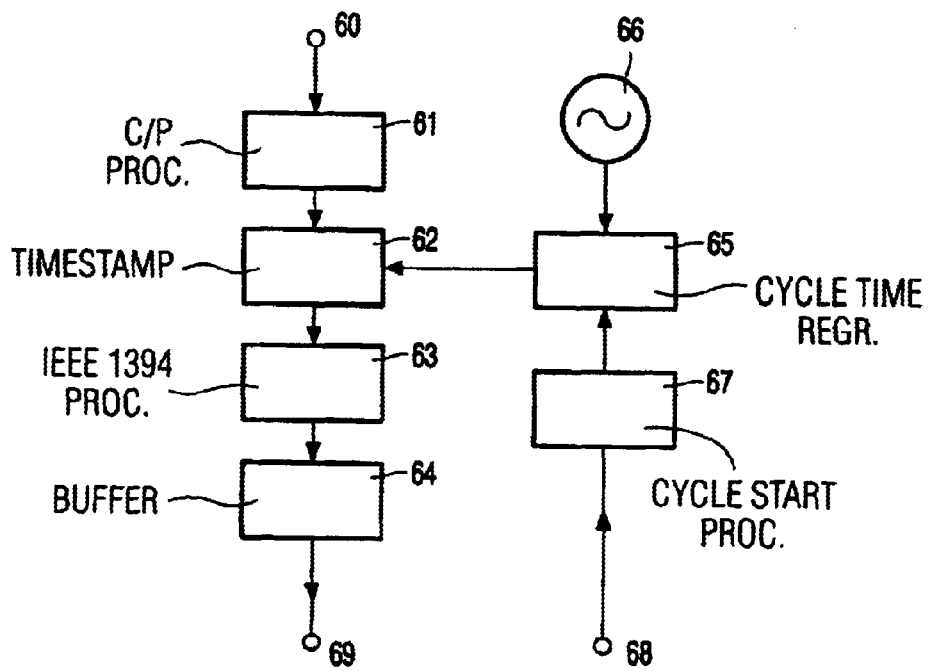
Figure 8:
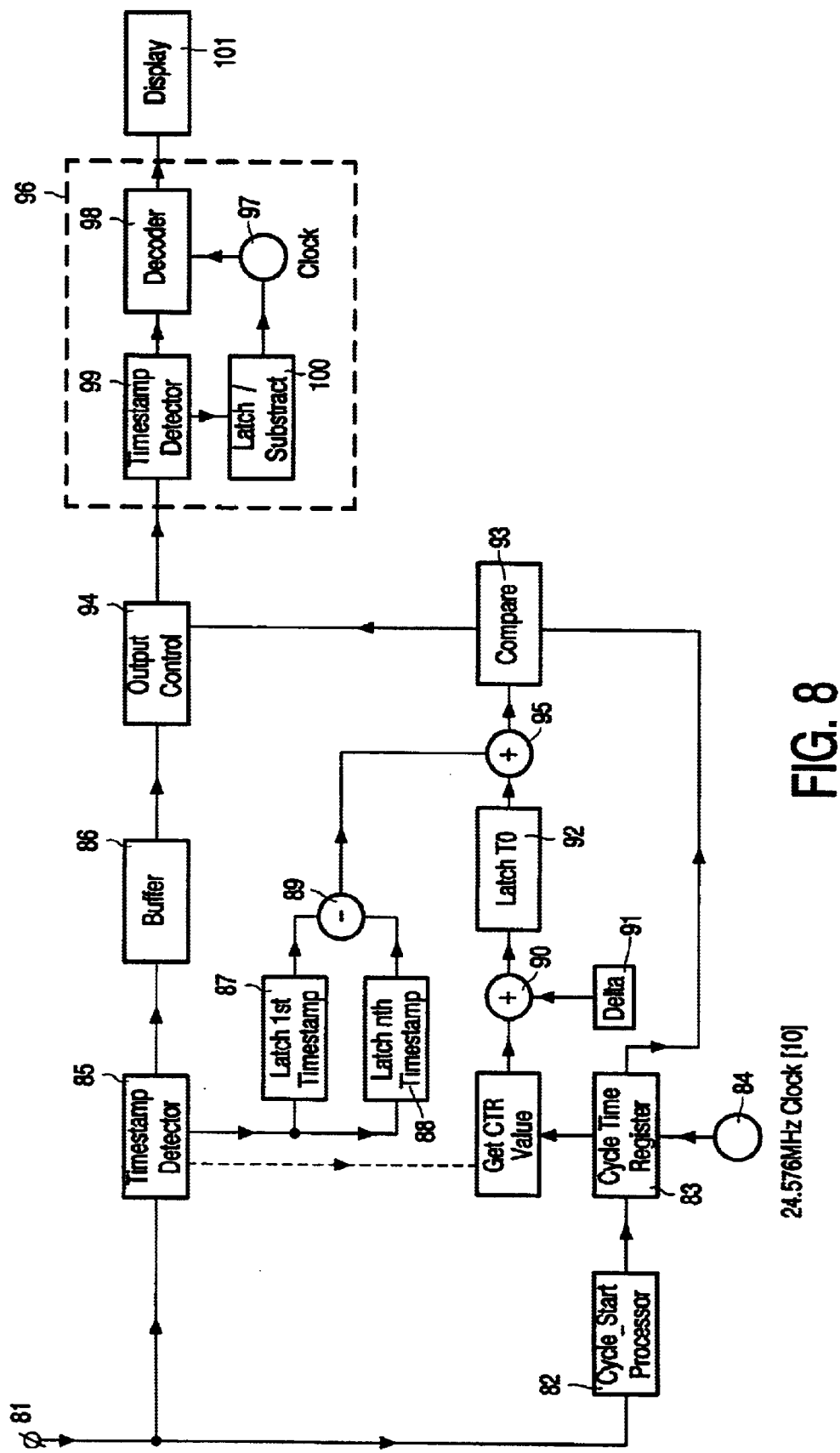

FIG. 4 shows in block schematic form a communication system including two interconnected IEEE1394 bus systems suitable for carrying out the method according to the invention, FIG. 5 shows in block schematic form a source of data encoded according to MPEG standards for transmission over the communication system of FIG. 4, FIG. 6 shows in block schematic form a transmitting device for transmitting MPEG data over the communication system of FIG. 4, FIG. 7 shows in block schematic form part of a Cycle Master for the IEEE1394 bus, and FIG. 8 shows in block schematic form a receiving device for receiving the MPEG encoded data transmitted over the communication system.

DETAILED DESCRIPTION

FIG. 4 shows in block schematic form one embodiment of apparatus according to the present invention in which a method for correcting timing errors when transmitting isochronous data through a packet based communication network may be achieved. As shown in FIG. 4 the communication system comprises first and second IEEE 1394 buses 1 and 2 that are coupled by means of a transmission bridge 3. The system clock on the bus 1 is synchronised in frequency with that on bus 2 by means of a frequency locking arrangement 4. A source of MPEG encoded data 5 is fed to a transmitting device 6 which takes the MPEG encoded data and inserts it in packets for transmission onto the bus 1. Also connected to the bus 1 is a Cycle Master 7 that synchronises all the clocks in the devices coupled to the bus 1 to the clock in the Cycle Master. A receiver 8 is coupled to the bus 2 for receiving the packets containing the MPEG encoded data transmitted by the transmitting device 6. A further Cycle Master 9 is connected to the bus 2 and defines the clocks for all the devices attached to the bus 2 including the receiver 8 for receiving and processing the received data packets. This Cycle Master 9 is synchronised in frequency to the output of the Cycle Master 7 but not in absolute time. In the present embodiment, the data source 5 feeds MPEG encoded video or audio signals to the transmitting device 6 and the receiving device includes an MPEG decoder. It is not essential to the invention that the data is encoded according to an MPEG standard or that the receiving device includes a decoder. For example, the receiving device could merely record the MPEG or other encoded data for replay on a further device that included such a decoder.

FIG. 5 shows an embodiment of a source of MPEG encoded signals which may be used in the communication system of FIG. 4. It comprises a video camera 50 whose output is fed to an MPEG encoder 51 which comprises a processor 52, timestamp module 53, and clock generator 54. The output of the MPEG encoder 51 may be fed directly to an output 56 which is connected to the transmitter 6 or may be used to produce a digital master of a tape or disc recording which will be reproduced by means of a disc or tape player 55. As stated above the MPEG encoder 51 is required to place a time stamp known as a Program Clock Reference (PCR) or System Clock Reference (SCR) on each packet of MPEG data. This timestamp is detected in the receiver and used to ensure isochronous decoding of the MPEG encoded signal. These MPEG PCR and/or SCR timestamps are inserted into the data stream an undefined length of time prior to any transmission using the IEEE1394 bus.

Both the transmitting device 6 and the receiving device 8 are isochronous capable IEEE1394 devices and contain a Cycle Time Register (CTR) which is synchronised in frequency by means of the receipt of a Cycle Start packet as described above but are not synchronised in absolute time if any transmission bridges are present in the communication system, that is if a plurality of IEEE1394 buses are connected together. The CTR in each device continues to be incremented between receipt of Cycle start packets by means of a free running local 24.576 MHz clock. The transmitting device 6 processes the MPEG encoded data at a rate determined directly or indirectly by timestamps included in the MPEG encoding. The processing by the transmitting devices includes adding a further timestamp referred to hereinafter as the transmission timestamp to each packet of MPEG encoded data. The transmission timestamp is equal to the value of the CTR of the transmitting device at the instant at which the packet is queued in the transmitting device for presentation to the communication system for transmission to the receiving device. The addition of this transmission timestamp to each data packet may be part of the encapsulation of the data packet into a packet of the CIP format that may be in accordance with the IEC61883 standard.

Figure 1:
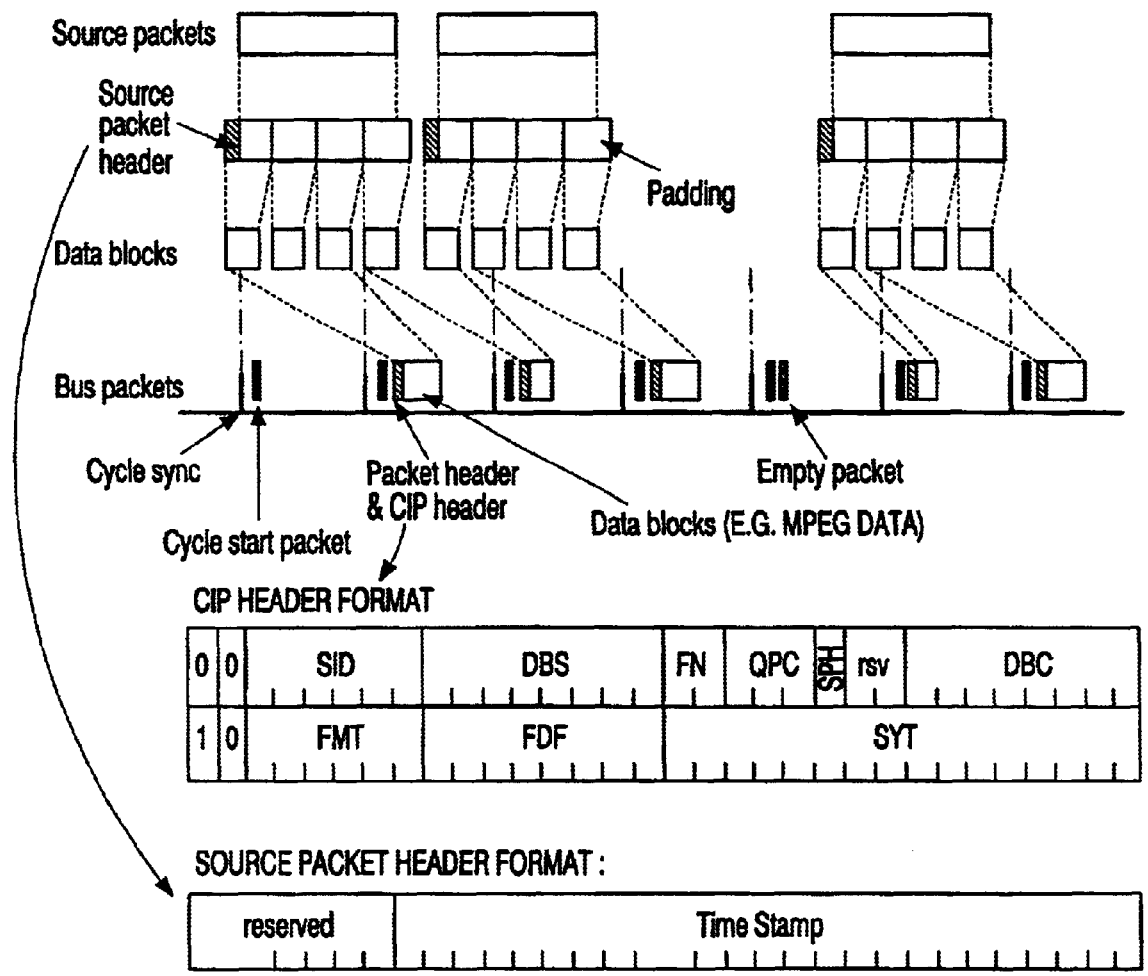
FIG. 1 shows packet formats defined in IEEE1394 and IEC61883 Standards.
Figure 2:
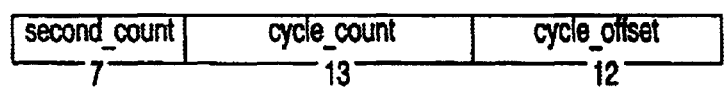
FIG. 2 shows the format of the Cycle Time Register.
Figure 3:
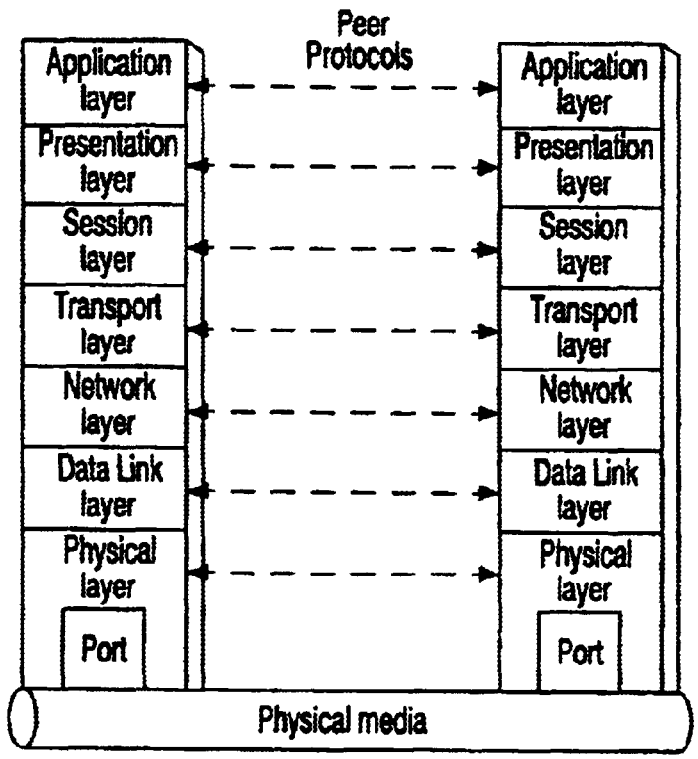
FIG. 3 shows the layered ISO model for communications systems.

FIG. 6 shows in block schematic form a transmitting device suitable for carrying out this process. It comprises an input 60 to which the output of the data source 5 is connected. The input data stream is passed to a CIP processor 61 that encapsulates the MPEG data packet into a CIP format data packet. This is passed through a timestamp module 62 that inserts the transmission timestamp into the source packet header as illustrated in FIG. 1. These packets are then fed to an IEEE1394 63 processor whose output is fed via a buffer 64 to an output terminal 69 that is connected to the bus 1. The transmitting device 6 also receives Cycle Start packets from the Cycle Master 7 over the bus 1 at the input 68. The Cycle Start packets are fed to a Cycle Start Processor 67 that controls a Cycle Time Register 65 in the transmitting device. The Cycle Time Register is, as with all the other devices, clocked by a free running 24.576 MHz clock 66. The output of the Cycle Time Register produces a clock signal which is capable of adding a timestamp to the data packets and as the transmitting device is slaved to the Cycle Master this time stamp will be valid for all the devices connected to the bus 1.

An embodiment of the Cycle Master is shown in FIG. 7 and comprises a Cycle Time Register 70 driven by a 24.576 MHz clock 71. The Cycle Time Register 70 feeds a Cycle Start Generator 72. The output of the Cycle Start Generator is fed via an output 73 onto the bus 1. All the slave Cycle Time Registers include a Cycle Start Processor which detects the signal produced by the Cycle Start Generator 72 and synchronises the Cycle Time Register in the slave unit, in this particular case the transmitting device 6, to the Cycle Time Register in the Cycle Master 7.

Sometime after the addition of the transmission timestamp to a packet within the transmitting device 6 the packet may begin to be transmitted through the communication system to the receiving device 8. A packet may encounter arbitrary delays as it is transmitted through the communication system, especially when any bridges 3 linking separate IEEE1394 buses are present. In addition to the arbitrary delays encountered by transmission through any transmission bridges there are further arbitrary delays encountered by a variable time delay before a packet may be accepted on to the bus. This delay may differ from packet to packet up to a certain maximum amount of jitter, which may be specified or calculated for any given communication technology. When using a method according to the present invention this transmission timestamp which has been inserted into the transmitted packets will not be further modified at any later stage in the communication process.

As has been stated above the Clock frequencies on the various interconnected buses are synchronised in frequency. This does not however mean that the Cycle Time Registers in the transmitting and receiving devices display the same time. As an analogy it will be apparent that the time at various places on the surface of the earth increment at precisely the same rate which is determined by the rotational speed of the earth but the absolute time at different positions of longitude will vary, for example Greenwich meantime is one hour different from Central European time.

An embodiment of a receiving device suitable for use as the receiving device 8 is shown in block schematic form in FIG. 8. It has an input 81 which is connected to the bus 2. This input receives Cycle Start packets from the Cycle Master 9 which is fed to a Cycle Start Processor 82 which is used to synchronise the Cycle Time Register 83 of the receiving device 8 with the Cycle Time Register in the Cycle Master 9. A 24.576 MHz clock 84 clocks the Cycle Time Register 83. The input 81 is also fed to a timestamp detector 85 that detects the presence of the transmission timestamps in the received signal. Thus the timestamp detector 85 reads and records the value $T_1$ of the transmission timestamp in the data packet and places the data packet into a buffer 86. The time of the first timestamp in a transmission is latched into a first timestamp latch 87 and each succeeding timestamp in the transmission stream is latched into a second timestamp latch 88. The output of the latches 87 and 88 are fed to first and second inputs of a subtractor circuit 89. When the first packet of a data stream is received the receiving device reads the time $t_1$ of its Cycle Time Register at the instant at which that packet is received. This time is fed to the first input of an adder circuit 90 whose second input receives from a delta 91 a given offset value which is chosen to be greater than or equal to the largest time jitter introduced by the communication system between the various packets being received. The result of the addition is fed to a latch 92 as a value $T_0$. For the first packet of a transmission this value $T_0$ is fed to the first input of a comparator 93 whose second input receives the output of the Cycle Time Register 83. Thus when the Cycle Time Register 83 reaches the time $T_0$ then the first data packet will be output from the buffer 86 by the output controller 94 and passed to the next stage within the receiving device.

When the next packet arrives at the receiving device the timestamp detector 85 detects the timestamp and latches it into the latch 88 and passes the data packet into the buffer 86. The subtractor 89 then subtracts the value $T_1$, which is the transmission timestamp of the first data packet from the value $T_n$ which is the timestamp of the current packet being received. The result of this subtraction is then added to the time $T_0$ by an adder 95 and presented to the first input of the comparator 93. Thus the time $T_0+(T_n-T_1)$ is the time which the Cycle Time Register 83 has to reach before the output controller 94 reads the packet from the buffer 86 into the following stages of the receiver.

It will be apparent that using this procedure the receiving device adds a given time to the time t1 at which the first transmission timestamp was detected as set by the time in the Cycle Time Register 83 at that instant and adds a given time which is sufficient to allow for any jitter in the communication system. The packet in the buffer 86 is then passed to the rest of the receiver when the cycle time register reaches the time $T_0$ which is equal to the time $t_1+\Delta$, that is the time registered by the Cycle Time Register 83 at the instant the first packet timestamp was detected plus the offset value $\Delta$. When each subsequent transmission timestamp arrives the value of the first transmission timestamp is subtracted from the value of the subsequent transmission timestamp and added to the time $T_0$ to determine when the packet is read from the buffer 86. Thus the receiving device is not required at any stage to modify any of the transmission timestamps.

Since the Cycle Time Register 83 in the receiving device is synchronised to the Cycle Time Register in the transmitting device the data packets are consequently passed to the next stage within the receiving device with substantially the same interpacket timing relationship as that at which they were processed by the transmitting device. The difference in absolute times is not important. Any CIP header information or other transmission packet headers may be removed from the received packets either prior to or after the packets are placed in the buffer 86. The next stage of the receiving device may be an MPEG decoder 96 that contains a further clock 97 a decoding circuit 98, a timestamp detector 99 and a latch/subtractor 100. The further clock 97 is the decoder clock and is totally independent of both the Cycle Time Register and the free running 24.576 MHz clock in the receiving device. The MPEG decoder may now use the PCRs or SCRs in the received substantially de-jittered packets to synchronise by conventional methods the decoder clock to substantially the same rate as the clock in the MPEG encoder which originally encoded the data. The MPEG decoder is thus enabled to decode and present the data to a display device 101 which may also form part of the receiving device at substantially the correct rate.

It will be apparent that it is necessary for the present invention that the clocks on the buses 1 and 2 are locked in frequency although they do not have to be locked in absolute time. This requires the transmission bridge 3 to include a frequency locking arrangement 4 which locks the frequency of the clocks on the two different buses 1 and 2. This may be achieved in a variety of ways. One is to send a short signal burst containing no information at precisely defined time intervals, thus enabling the clocks on both sides of the transmission bridge to be synchronised. An alternative method is to send a message across the bridge containing time information. This message may be sent at a relatively random time interval as the message will cause the clocks to adopt the same time each time the message is sent across the transmission bridge. The way in which the clocks on the interconnected buses are synchronised is unimportant in implementing the invention. It is merely a requirement that the clocks should be so synchronised in frequency.

Although the invention has been described using the example of MPEG data transmitted using IEEE1394 bus arrangements it is not limited to such a communication system. It is applicable to the transmission of any isochronous data over a packet transported network where transmission jitter may occur. It is further applicable where there may be an imprecisely defined time interval between the encoding and decoding functions which mean that a received time stamp may have an earlier time than the actual time as measured at the receiving device.

It will be apparent to the person skilled in the art that many modifications may be made to the embodiment described, which is merely one example of how the invention may be carried out. For example in determining the time at which the receiver should start to process the received data it would be possible to add the interarrival time of each packet to the process time of the previous packet. In this case instead of storing the time of arrival of the first packet of the stream it is necessary to store the previous packet arrival time.

From reading the present disclosure, other modifications will be apparent to persons skilled in the art. Such modifications may involve other features which are already known in the design and use of communication systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation of one or more of those features which would be obvious to persons skilled in the art, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A method of correcting timing errors when transmitting isochronous data through a packet based communication network in which at least some of the data packets contain timestamps which indicate to a receiver the time at which the data should be processed, the method comprising:
   a) inserting transmission timestamps in isochronous data packets which relate to an absolute time as defined by a transmission clock and which are to be transmitted over a transmission network,
   b) receiving the data packets and detecting and temporally recording the transmission timestamps therein,
   c) providing a receiver clock which is synchronised in frequency but not necessarily in absolute time with the transmission clock,
   d) storing the absolute time of the receiver clock when the first packet containing a transmission timestamp is received,
   e) adding a given time offset to the stored receiver clock time, the offset being greater than or equal to the maximum variation in time between successive received data packets, to define the output time of the first of the received data packets
   f) subtracting the value of the transmission timestamp in the first received data packet from the transmission timestamp in each subsequently received data packet, and
   g) adding the difference between the transmission timestamp of the present data packet and the transmission timestamp of the first data packet to the output time of the first data packet to define the output time of the present packet.

2. A method as claimed in claim 1 wherein the data is MPEG encoded data and the transmission timestamps are separate from and independent of any MPEG timestamps.

3. A method as claimed in claim 2 wherein the data is transmitted using the Common Isochronous Packet Format defined in IEC61883.

4. A method as claimed in claim 1 in which the communication system operates according to an IEEE1394 standard.

5. A method as claimed in claim 1 in which the communication system operates in Asynchronous Transfer Mode.

6. A method as claimed in claim 1 in which the communication system operates according to a Universal Mobile Telecommunications System standard.

7. Apparatus for correcting timing errors when transmitting isochronous data through a packet based communication network in which at least some of the data packets contain timestamps which indicate to a receiver the time at which the data should be processed, the apparatus comprising means for inserting transmission timestamps in isochronous data packets which relate to an absolute time as defined by a transmission clock, means for transmitting the data packets over a transmission network, means for receiving the data packets and detecting and temporarily recording the transmission timestamps therein, a receiver clock which is synchronised in frequency but not necessarily in absolute time with the transmission clock, means for storing the absolute time of the receiver clock when the first packet containing a transmission timestamp is received, means for adding a given time offset to the stored receiver clock time, the offset being greater than or equal to the maximum variation in time between successive received data packets, to define the output time of the first of the received data packets, means for subtracting the value of the transmission timestamp in the first received data packet from the transmission timestamp in each subsequently received data packet, and means for adding the difference between the transmission timestamp of the present data packet and the transmission timestamp of the first data packet to the output time of the first data packet to define the output time of the present packet.

8. Apparatus as claimed in claim 7 in which the means for inserting the transmission timestamps comprises a Cycle Time Register.

9. Apparatus as claimed in claim 8 in which a plurality of transmitting and/or receiving devices each containing a Cycle Time Register are connected to an IEEE1394 bus and one of the Cycle Time Registers forms a Cycle Master which transmits a Cycle Start packet to the other Cycle Time Registers to maintain them all in synchronism.

10. Apparatus as claimed in claim 9 in which the communication system comprises a plurality of IEEE1394 buses coupled by transmission bridge(s) wherein the Cycle Masters on each bus are synchronised in frequency.

11. Apparatus as claimed in claim 10 in which the bridges are arranged to operate according to the IEEEp1394.1 standard.

12. Apparatus as claimed in claim 7 in which the communication system employs Asynchronous Transfer Mode.

13. Apparatus as claimed in claim 7 in which the communication system is a Universal Mobile Telecommunications System (UMTS).

14. Apparatus as claimed in claim 7 in which the data is audio and/or video signals encoded according to an MPEG standard.

15. Apparatus as claimed in claim 14 in which the transmitting means includes an MPEG encoder.

16. Apparatus as claimed in claim 14 or claim 15 in which the receiver includes an MPEG decoder.

* * * * *